UNITED STATES PATENT OFFICE.

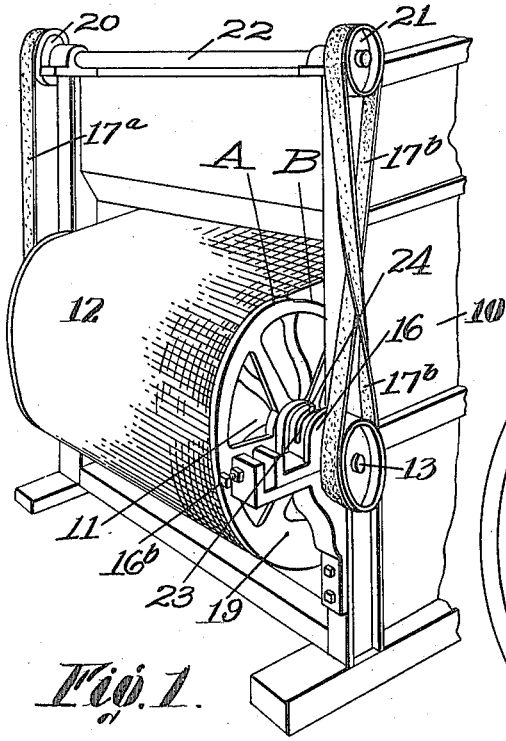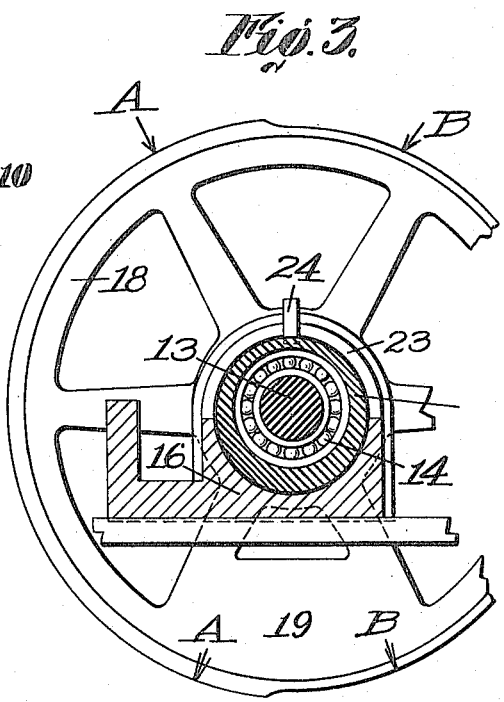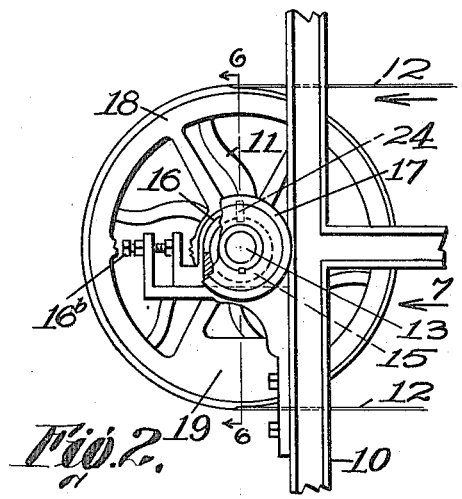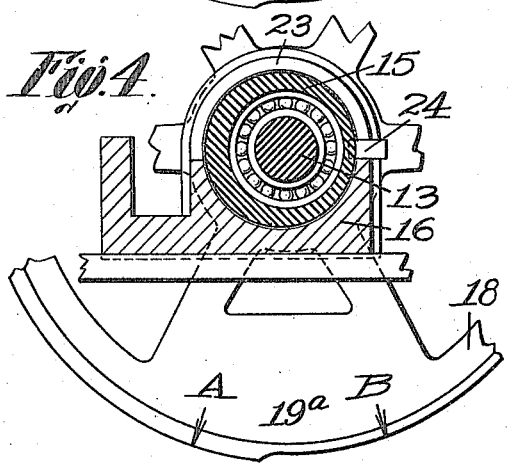

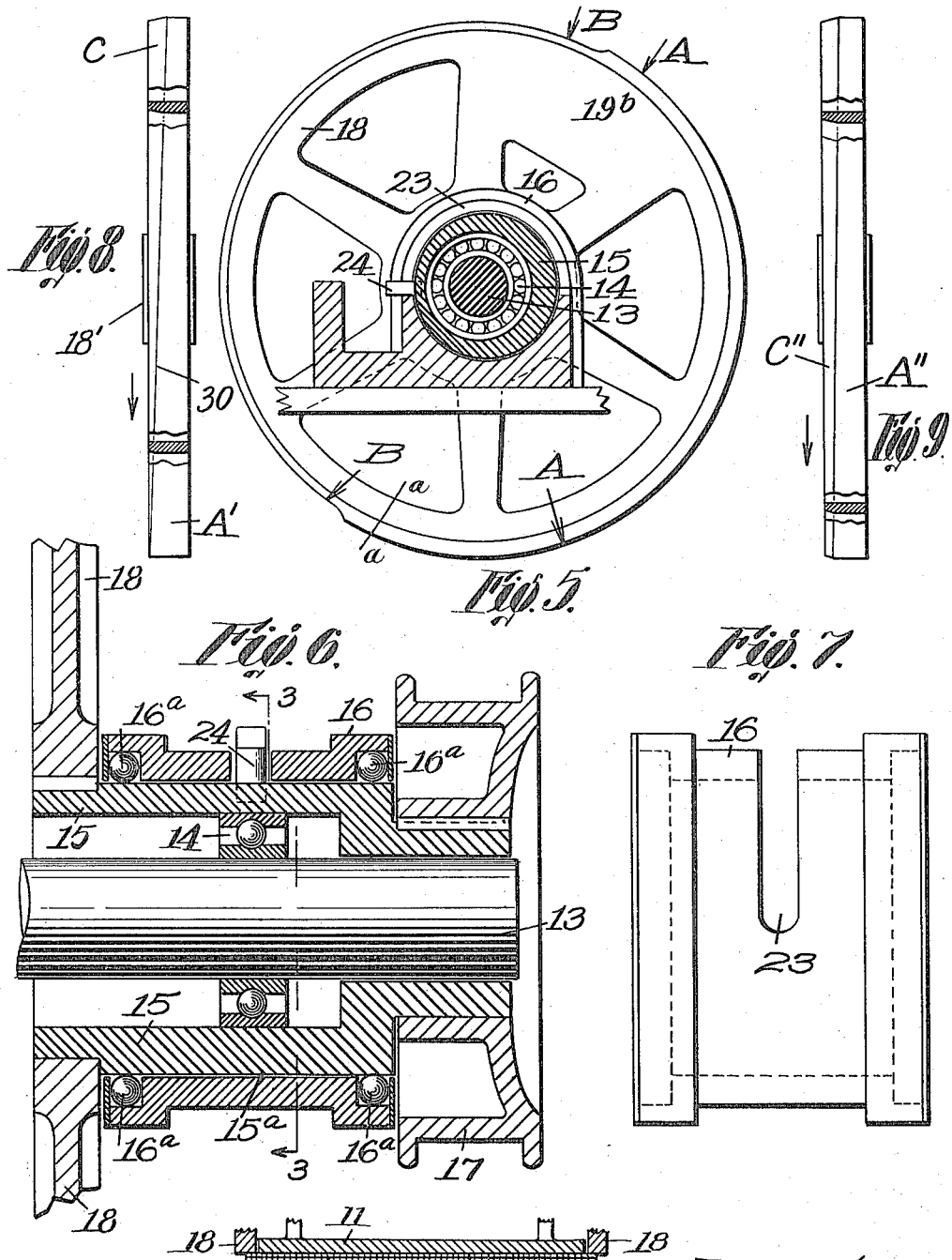

FREDERICK G. SARGENT AND CHARLES T. BROOKS, OF WESTFORD, MASSACHUSETTS, ASSIGNORS TO C. G. SARGENT'S SONS CORPORATION, OF GRANITEVILLE, MASSACHUSETTS, A CORPORATION OF MASSACHUSETTS.

APRON-GUIDING DEVICE.

1,152,439.   Specification of Letters Patent.   Patented Sept. 7, 1915.

Application filed March 19, 1915. Serial No. 15,570.

*To all whom it may concern:*

Be it known that we, FREDERICK G. SARGENT and CHARLES T. BROOKS, citizens of the United States, both residing at Westford, in the county of Middlesex and State of Massachusetts, have invented a new and useful Apron-Guiding Device, of which the following is a specification.

This invention relates particularly to an apron guiding device, although the invention is capable of general application and its use is not limited to any particular class of machines.

The invention is in the nature of an improvement upon the construction shown in prior Patent No. 1,096,268 issued May 12, 1914 in which is described a device for shifting a drum-supporting shaft laterally to correct any tendency of an apron or band traveling on said drum to run too far toward either end of the drum. In the device therein shown there is no provision for returning the shaft to its normal or neutral lateral position after correction has been effected, until the apron has traveled beyond its proper position and has commenced to run beyond the opposite edge of the drum. It is then necessary to apply a correction in the opposite direction to correct this second sidewise deviation. It has been found in actual use that this method of operation results in a zig-zag travel of the apron, with alternate sidewise deviations, instead of normally retaining the apron and drum in correct or neutral position. While the lateral deviations are of slight extent it is nevertheless desirable to avoid these successive over-corrections.

It is one object of our present invention to provide means for automatically returning the apron and drum to normal or neutral position whenever the apron is restored to its central position and further correction becomes unnecessary. To the accomplishment of this object, we provide, in the preferred embodiment of our invention, a pair of eccentrically weighted pulleys mounted adjacent the opposite ends of the apron drum and supported upon eccentrically mounted bushings which also support the bearings for the drum shaft. The eccentrically-disposed weights act to return the pulleys and bushings to normal position after displacement therefrom.

A further object of our invention is to provide means by which the displacement of the pulleys may be more accurately proportioned to the deviation of the apron and to the accomplishment of this object we cut away a portion of the contact surfaces of the pulleys as will be hereinafter set forth in detail.

Our invention further relates to certain devices and combinations of parts which will be hereinafter described and more particularly pointed out in the appended claims.

Preferred forms of our invention are shown in the drawings in which,

Figure 1 is a perspective view of one end of a drying machine having our apron guiding device embodied therein; Fig. 2 is a side elevation partly in section of one of the cylinder or drum bearings; Fig. 3 is a transverse section through the bearing shown in Fig. 2, on the line 3—3 in Fig. 6; Figs. 4 and 5 are transverse sections similar to Fig. 3 but showing slight modifications of the invention; Fig. 5ª is a sectional view through the drum, the apron and the adjusting pulleys, taken on the line *a*—*a* of Fig. 5; Fig. 6 is a longitudinal sectional view of one of the bearings taken on the line 6—6 in Fig. 2; Fig. 7 is an end elevation of the bearing box looking in the direction of the arrow 7 in Fig. 2, and Figs. 8 and 9 are end elevations showing modified forms of the pulleys which position the bearing bushings.

The device is shown as applied to a wool drying machine having a frame 10 upon which is rotatably mounted a cylinder or drum 11 carrying an apron 12. The drum 11 is mounted upon a shaft 13 which is supported upon self-alining anti-friction bearings 14 (Fig. 6) secured within rotatable bushings 15. The outer bearing surface 15ª of each bushing 15 is eccentric with respect to the anti-friction bearing 14, each bushing being supported upon its eccentric surface by ball bearings 16ª in a bearing box 16. Each box is movable to adjust the shaft 13 laterally and is held in adjusted position by a screw 16ᵇ. At each end of its eccentric portion the bushing 15 is provided with portions concentric with the bearing 14, upon which are fixed pulleys 17 and 18. Each pulley 18 is positioned closely adjacent to one end of the drum 11 and has its circumference formed of two diameters A and B, the larger diameter A being substantially the same as the diameter of the drum 11. The parts of each diameter occupy substantially one-half of the circumference. Each pulley 18 is also provided with an eccentrically - disposed weight 19 which causes the pulley to remain normally in the position shown in Fig. 3. The two pulleys 17 are connected by straight and cross belts 17ª and 17ᵇ to pulleys 20 and 21 upon a transverse shaft 22 mounted in bearings above the drum.

In certain forms of our invention the pulleys 17, 20 and 21, the shaft 22 and the connecting belts 17ª, and 17ᵇ may be omitted.

As shown in Fig. 7, each bearing box 16 is provided with a circumferential slot 23 within which is positioned a stop pin 24 (Fig. 6) in the bushing 15. The slot 23 extends through substantially 180 degrees. In the form shown in Figs. 1, 2 and 3, the pin 24 is so positioned that it will stand substantially mid-way between the two ends of the slot 23 when the pulley 18 is in its normal position with the eccentric weight directly below the axis. In this position that portion of the surface of the pulley 18 of larger diameter A will occupy a position to the left of the axis, as viewed in Fig. 3. The parts will remain in this position as long as the apron 12 occupies its correct position upon the drum 11. When the apron deviates from this position in either direction, it will engage one or the other of the pulleys 18, turning the same in the direction of travel of the apron and thereby turning the eccentric bushing 15 within its bearing box 16 substantially 90 degrees or until the pin 24 engages one end of the slot 23. This partial rotation of the bushing 15 will move the bearing 14 of the shaft 13 to the left, thus causing the apron 12 to travel toward the opposite end of the drum 11. While this correcting movement of one bushing 15 is taking place the connection between the bushings through the belts 17ª and 17ᵇ and the shaft 22 causes a movement of the bushing 15 at the opposite end of the drum, similar in extent but opposite in direction. As soon as the apron has returned to mid-position between the two pulleys 18, the displaced pulleys are free to return to their normal position under the influence of their eccentric weights 19. Such movement of the pulleys 18 shifts the bushings 15 to restore the shaft 13 to its normal lateral position, the movement of the pulleys being facilitated by the anti-friction bearings 14 and 16ª. In this form of the invention, the eccentric weight may be placed upon the shaft 22 instead of upon the pulleys 18, the operation of the device being the same with either arrangement.

It has been explained that contact of the apron with the part A of one of the pulleys 18 usually results in angularly moving the pulley and its bushing until the stop 24 engages an end of the slot 23. When it is desirable that the angular displacement be more accurately proportioned to the deviation of the apron, we employ the constructions shown in Figs. 8 and 9. In Fig. 8, we have shown the raised portion A of the pulley 18' as being cut-away on the line 30 on the side adjacent the end of the apron drum, thus providing a beveled portion C of gradually increasing width, as indicated by the inset sections. When the apron runs over the end of the drum it will engage the raised surface A' at its point of greatest width and will turn the pulley 18 in the direction of the arrow in Fig. 8, thus, successively engaging portions of the raised surface separated by increasing distances from the end of the drum. At some point in the angular displacement of the pulley the contact of the apron upon the portion A' will become insufficient to further displace the pulley, the displacement thus being proportioned to the deviation of the apron. The arrangement shown in Fig. 9 is substantially similar, with the exception that the raised portion A'' is made slightly larger than the drum 11 and on this account the beveled portion C'' is of relatively greater width. This form is sometimes desirable on account of the low frictional coefficient of wire mesh fabric when engaging a smooth metal surface. Either one of these modified contact surfaces may obviously be provided upon any one of the pulleys shown in Figs. 1 to 5 inclusive, or upon the pulleys shown in the prior Patent #1,096,268.

In Fig. 4 we show a second form of our invention in which we have omitted the pulleys 17 and the belt connections therefor, and have positioned the eccentric weight 19ª at a different angle with reference to the eccentric bushing 15 and the pin 24. The operation of the device is substantially the same as that already described, with the exception that the eccentric bushing is permitted to move substantially 180 degrees in one direction only. In this form the entire correcting movement takes place at one end of the drum instead of being divided between the two ends as in the previous form, the increased angular movement causing greater displacement of the shaft at the adjusted end.

A further modification is shown in Figs. 5 and 5ª in which the drum 11 is made slightly shorter than the width of the apron so that the apron normally projects beyond the drum at each end, thus normally engaging both pulleys 18. Such engagement turns the pulleys to the position shown in Fig. 5, placing the shaft 13 in its extreme outer or left-hand position. Each pulley 18 is thus displaced from its normal position when the apron is centrally located on the drum, the weights 19ᵇ being held above the axis as shown. Whenever the apron deviates to one side far enough to leave the opposite pulley 18 free, its weight 19ᵇ acts to rotate the bushing 15 associated therewith in a direction opposite to the travel of the apron. The displacement of the shaft 13 is thus opposite in direction to that taking place with the forms shown in Figs. 3 and 4. In each of the forms shown, however, it will be evident that transverse deviation of the belt produces a lateral change in the position of the shaft 13 and that the shaft is returned to its initial lateral position as soon as the apron returns to mid-position upon the drum 11.

By the provision of a portion of smaller diameter the apron tension upon the pulley is relieved when the pulley has reached its extreme displacement.

Having thus described our invention, it will be evident that other changes and modifications can be made therein by those skilled in the art without departing from the spirit and scope thereof as set forth in the claims and we do not wish to be otherwise limited to the details herein disclosed, but

What we do claim is:—

1. In an apron guiding device, in combination, a rotatable shaft and a drum fixed to said shaft, means controlled by surface engagement with said apron effective to shift the bearings of said shaft laterally when the apron deviates from central position, and additional means acting independently of said first named means effective to restore said bearings to initial position when the apron returns to central position.

2. In an apron guiding device, in combination, a rotatable shaft, a drum fixed to said shaft, a pulley rotatable concentric with said shaft and having a portion of substantially the same diameter as said drum, means for moving one end of the shaft laterally when the apron engages and turns the pulley, and means to automatically restore the pulley and shaft to initial position when the pulley is freed from said apron.

3. In an apron guiding device, a rotatable shaft, a drum fixed on said shaft, bearings for said shaft comprising a rotatable bushing having an eccentric outer bearing surface and also having a concentric outer portion, a pulley secured to said concentric portion, said pulley being positioned closely adjacent one end of said drum and having a portion of substantially the same diameter as said drum, and means for yieldingly restoring said pulley and bushing to predetermined initial position after angular displacement therefrom.

4. The combination, with a drum for carrying a traveling apron, of an idle pulley at the end of the drum rotatable independently thereof, means operated by said pulley when turned on the axis of the drum for moving the end of the drum laterally, and means for retaining said pulley in predetermined initial position and for automatically restoring said pulley to such position after displacement therefrom.

5. The combination with a drum for carrying a traveling apron, of an idle pulley at the end of the drum rotatable independently thereof, and means operated by said pulley when turned on its axis for moving the end of the drum laterally, said pulley being eccentrically weighted so that it will automatically return to initial position after displacement therefrom.

6. In an apron guiding device, a rotatable shaft, a drum fixed on said shaft, bearings for said shaft comprising a rotatable bushing having an eccentric outer bearing surface and also having a concentric outer portion, a pulley secured to said concentric portion, said pulley being positioned closely adjacent one end of said drum and having a portion of substantially the same diameter as said drum, and means for yieldingly restoring said pulley and bushing to predetermined initial position after angular displacement therefrom, said pulley having its outer surface formed of two diameters, the larger of which corresponds to the diameter of the drum.

7. In an apron guiding device, in combination, a rotatable shaft, bearings for said shaft, a drum fixed on said shaft, pulleys rotatable concentric with said shaft, at each end and closely adjacent said drum, eccentric bushings rotatable with said pulleys and supporting the shaft bearings, eccentric weights on said pulleys, normally retaining said pulleys and bushings in initial position, and connections between said bushings whereby displacement of one bushing in one direction will equally displace the other bushing in the opposite direction, the eccentric weights automatically restoring both bushings to initial position when free to move, after displacement therefrom.

8. In an apron guiding device, in combination, a rotatable shaft, bearings for said shaft, a drum fixed on said shaft, pulleys rotatable concentric with said shaft, at each end and closely adjacent said drum, and eccentric bushings rotatable with said pulleys and supporting the shaft bearings, said pulleys having each a raised portion thereon constituting a contacting surface and said raised portion being separated by increasing distances from the end of said drum, at successive points on the circumference of said pulleys.

9. In an apron guiding device, in combination, a rotatable shaft, bearings for said shaft, a drum fixed on said shaft, pulleys rotatable concentric with said shaft, at each end and closely adjacent said drum, and eccentric bushings rotatable with said pulleys and supporting the shaft bearings, said pulleys having each a raised portion thereon constituting a contacting surface and said raised portion being cut-away upon an oblique line on the side adjacent the end of said drum, and being thereby increasingly separated from the end of the drum.

10. In an apron guiding device, in combination, a rotatable shaft, bearings for said shaft, a drum fixed on said shaft, pulleys rotatable concentric with said shaft, at each end and closely adjacent said drum, and eccentric bushings rotatable with said pulleys and supporting the shaft bearings, said pulleys having each a raised portion of slightly larger diameter than said drum and constituting a contacting surface, and said raised portion being cut-away upon an oblique line on the side adjacent the end of said drum and being thereby increasingly separated from the end of the drum.

In testimony whereof we have hereunto set our hands.

FREDERICK G. SARGENT.
CHARLES T. BROOKS.

Copies of this patent may be obtained for five cents each, by addressing the "Commissioner of Patents, Washington, D. C."